United States Patent
Esnee et al.

(10) Patent No.: US 11,535,225 B2
(45) Date of Patent: Dec. 27, 2022

(54) ELECTROMECHANICAL-TYPE DISC BRAKE CALIPER COMPRISING TWO MECHANICAL ACTUATORS TO COMPENSATE FOR AN UNEVEN WEARING OF THE ONE SAME BRAKE PAD

(71) Applicant: FOUNDATION BRAKES FRANCE, Drancy (FR)

(72) Inventors: Didier Esnee, Le Mans (FR); Xavier Labarre, Saint Georges du Bois (FR); Mehdi Moumane, Angers (FR)

(73) Assignee: FOUNDATION BRAKES FRANCE, Drancy (FR)

( * ) Notice: Subject to any disclaimer, the term of this patent is extended or adjusted under 35 U.S.C. 154(b) by 14 days.

(21) Appl. No.: 16/766,377

(22) PCT Filed: Nov. 20, 2018

(86) PCT No.: PCT/FR2018/052920
§ 371 (c)(1),
(2) Date: May 22, 2020

(87) PCT Pub. No.: WO2019/102133
PCT Pub. Date: May 31, 2019

(65) Prior Publication Data
US 2020/0361437 A1 Nov. 19, 2020

(30) Foreign Application Priority Data
Nov. 24, 2017 (FR) ........................ 1761163

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/065* (2013.01); *F16D 55/226* (2013.01);
(Continued)

(58) Field of Classification Search
CPC .. F16D 55/226; F16D 65/183; F16D 2121/24; F16D 2125/48; F16D 2125/52;
(Continued)

(56) References Cited

U.S. PATENT DOCUMENTS

2015/0129371 A1* 5/2015 Gutelius ................. F16D 65/18
188/72.1
2016/0290424 A1* 10/2016 Gutelius ................. F16D 65/18
(Continued)

FOREIGN PATENT DOCUMENTS

FR 3045757 A1 6/2017
FR 3045758 A1 6/2017

OTHER PUBLICATIONS

International Search Report for PCT/FR2018/052920 dated Feb. 13, 2019.
(Continued)

*Primary Examiner* — Nicholas J Lane
(74) *Attorney, Agent, or Firm* — Pearne & Gordon LLP

(57) ABSTRACT

A brake caliper comprising: a set of brake pads positioned on each side of a brake disc; a first actuator including a first drive gearwheel driving a first mobile piston pressing against a first portion of brake pad in order to move same; a second actuator including a second drive gearwheel driving a second mobile piston pressing against a second portion of the pad in order to move same, with a mode of operation that is the opposite of that of the first actuator; a first and a second worm screws which are secured to one another and of opposite hand to one another, rotationally driven and capable of translational movement in their longitudinal (Continued)

direction and in mesh with the first and second gearwheels respectively in order to turn these in opposite directions.

15 Claims, 4 Drawing Sheets

(51) Int. Cl.
| | |
|---|---|
| *F16D 55/226* | (2006.01) |
| *F16D 65/18* | (2006.01) |
| *F16D 121/24* | (2012.01) |
| *F16D 125/40* | (2012.01) |
| *F16D 125/48* | (2012.01) |
| *F16D 125/50* | (2012.01) |
| *F16D 125/52* | (2012.01) |

(52) U.S. Cl.
CPC ........ *F16D 65/183* (2013.01); *F16D 2121/24* (2013.01); *F16D 2125/40* (2013.01); *F16D 2125/48* (2013.01); *F16D 2125/50* (2013.01); *F16D 2125/52* (2013.01)

(58) Field of Classification Search
CPC ............. F16D 2125/40; F16D 2125/54; B60T 13/746; B60T 1/065
See application file for complete search history.

(56) References Cited

U.S. PATENT DOCUMENTS

| | | | |
|---|---|---|---|
| 2017/0370433 A1* | 12/2017 | Chelaidite | ............. F16D 55/225 |
| 2018/0051760 A1 | 2/2018 | Foucoin et al. | |
| 2018/0372177 A1 | 12/2018 | Esnee | |
| 2019/0003535 A1 | 1/2019 | Esnee et al. | |
| 2019/0219117 A1* | 7/2019 | Choi | ..................... F16D 65/183 |
| 2021/0122351 A1* | 4/2021 | Hong | .................... F16D 65/568 |

OTHER PUBLICATIONS

Written Opinion for PCT/FR2018/052920 dated Feb. 13, 2019.
Search Report for French Application No. 1761163 dated Aug. 28, 2018.

* cited by examiner

ELECTROMECHANICAL-TYPE DISC BRAKE CALIPER COMPRISING TWO MECHANICAL ACTUATORS TO COMPENSATE FOR AN UNEVEN WEARING OF THE ONE SAME BRAKE PAD

CROSS-REFERENCE TO RELATED APPLICATIONS

This is a National Stage of PCT international application PCT/FR2018/052920, filed on Nov. 20, 2018, which claims the priority of French Patent Application No. 1761163, filed Nov. 24, 2017, both of which are incorporated herein by reference in their entirety.

TECHNICAL FIELD

The invention relates to an electromechanical-type disc brake caliper for an automotive vehicle, that is equipped with an electric motor driving mechanical actuators.

STATE OF PRIOR ART

In a hydraulic-type disc brake caliper, as well as in an electromechanical-type brake caliper, several actuators can be provided to press together a same pad against the disc when the brake is activated.

The invention more particularly relates to a disc brake caliper including an electromechanical actuator including a first and a second mechanical actuators extending side by side facing a pad. The first actuator pushes a first pad portion which is close to a first end of this pad and the second actuator pushes a second pad portion which is close to a second end of this pad.

A pad includes a support to which a friction lining for coming alone into friction with a face of the disc in order to brake it.

In practice, it appears that such pads wear out unevenly, resulting in a lining thickness which is reduced from one end to the other end of the pad.

In the case of a hydraulic caliper, the uneven thickness of the pad is compensated for by the fact that the actuators which push it are connected to a same hydraulic circuit. With such a circuit, the operation corresponds to that of force feedback control, which thereby enables the actuators to have movements of different lengths.

Concretely, upon braking, the pressurisation of the hydraulic circuit, and thereby of the hydraulic actuators, moves the pistons of these actuators to the disc according to movements that can be different. These movements are carried out until the pistons press the entire pad against the disc, the pressure remaining the same in the circuit and in the actuators at any time.

As a result, with a hydraulic caliper, adjusting an uneven wear of the pad is naturally made.

With an electromechanical-type caliper, it is a same motor which drives the mechanical actuators pushing a pad, through a transmission mechanism such that they move the disc pistons closer to each other in order to press the pad.

If the mechanism ensures a direct type transmission between the motor rotation and the rotation of the members moving the pistons, an uneven thickness of a pad cannot be compensated for because the movements and home positions of the pistons are not necessarily the same.

Concretely, upon braking with such a direct type transmission, as an actuator presses the pad portion it pushes against the disc, the pressing force exerted onto the disc counteracts the motor torque: the motor rotation is locked and the mechanism comes to a halt by stopping the stroke of the other piston.

One object of the invention is to overcome this drawback by providing a transmission mechanism which enables an uneven wear of a pad to be adjusted, in an electromechanical-type brake caliper with mechanical actuators driven by a same electric motor.

DISCLOSURE OF THE INVENTION

To that end, one object of the invention is a brake caliper for overlapping a brake disc, which comprises a set of pads and an electromechanical actuator for pressing a pad against a face of the disc, characterised in that the electromechanical actuator comprises:

an electric motor driving a first mechanical actuator and a second mechanical actuator;

the first mechanical actuator including a first drive gear and a first piston for pressing a first portion of the pad;

the second mechanical actuator including a second drive gear and a second movable piston for pressing a second portion of the pad;

each actuator converting a rotation of its drive gear into a translation of its piston, the first and second actuator having reverse conversion senses;

a transmission module comprising:

a first worm and a second worm having a same longitudinal direction and having reverse winding senses while being rigidly integral with each other, these first and second worms being meshed with the first and second drive gears respectively to simultaneously rotate them in reverse senses;

means for rotatably driving the first and second worms by the electric motor, these means forming a slide connection enabling the first and the second worms to translationally move along the longitudinal direction.

With this solution, when a pad portion comes in contact with the disc, the drive gear of the corresponding actuator comes to a halt, but the worms continue to rotate by being translated to move the piston of the actuator associated with the other part of the pad. The mechanism thus compensates for an uneven wear of the pad by ensuring that this pad is fully pressed against the disc upon braking.

The invention also relates to a brake caliper thus defined, wherein the means forming a slide connection and for rotatably driving the worms of the transmission module include:

a rotary shaft rigidly carrying the first and second worms, this shaft being translationally movable along the longitudinal direction;

a translationally fixed gear rotated by the electric motor, this gear comprising a splined through hole in which a splined end of the shaft is engaged.

The invention also relates to a brake caliper thus defined, wherein the means forming a slide connection and for rotatably driving the worms of the transmission module include:

a sleeve rigidly carrying the first and second worms, this sleeve being translationally movable along the longitudinal direction;

a translationally fixed gear rotated by the electric motor;

a rotary shaft which is rigidly integral with and project from the gear by including external splines, this rotary shaft extending along the longitudinal direction by being surrounded by the sleeve;

internal splines carried by the sleeve with which the external splines mesh by form fitting.

The invention also relates to a brake caliper thus defined, wherein the internal splines project from a hub rigidly connected to the sleeve.

The invention also relates to a brake caliper thus defined, wherein the first and second drive gears have oblique teeth and rotate about axes parallel to each other and perpendicular to the longitudinal direction.

The invention also relates to a brake caliper thus defined, comprising a reduction module which transmits rotation of the motor to the means for rotatably driving the first and second worms.

The invention also relates to a disc brake comprising a brake caliper thus defined.

DETAILED DISCLOSURE OF PARTICULAR EMBODIMENTS

Figure 1:
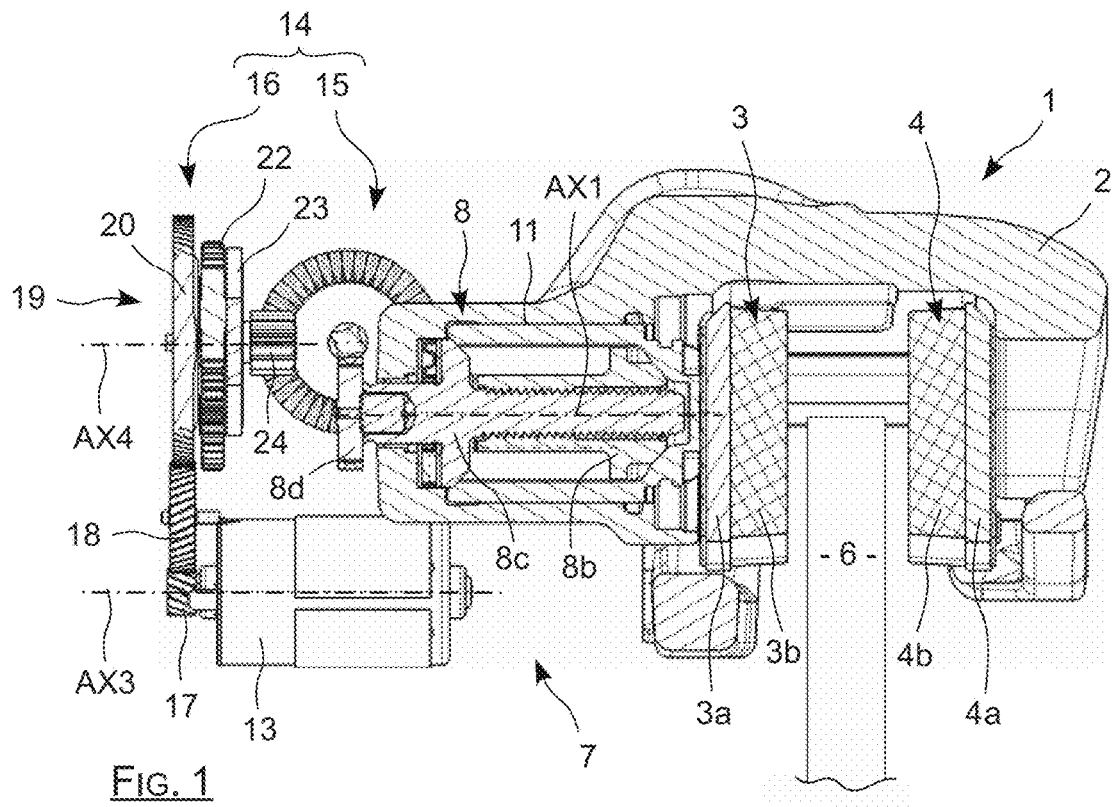
FIG. 1 is a cross-section view of a disc brake caliper according to the invention along a cross-section plane longitudinally passing through the first mechanical actuator.

As is visible in FIG. 1, a floating mounted caliper 1 comprises a caliper body 2 which carries a set of pads 3 and 4 on either side of a brake disc 6, and which is equipped with an electromechanical actuator 7 to press these pads 3 and 4 against the disc 6 in a braking situation.

The pad 3 comprises a support 3a to which a lining 3b is attached. In the same way, the pad 4 comprises a support 4a to which a lining 4b is attached.

Figure 2:
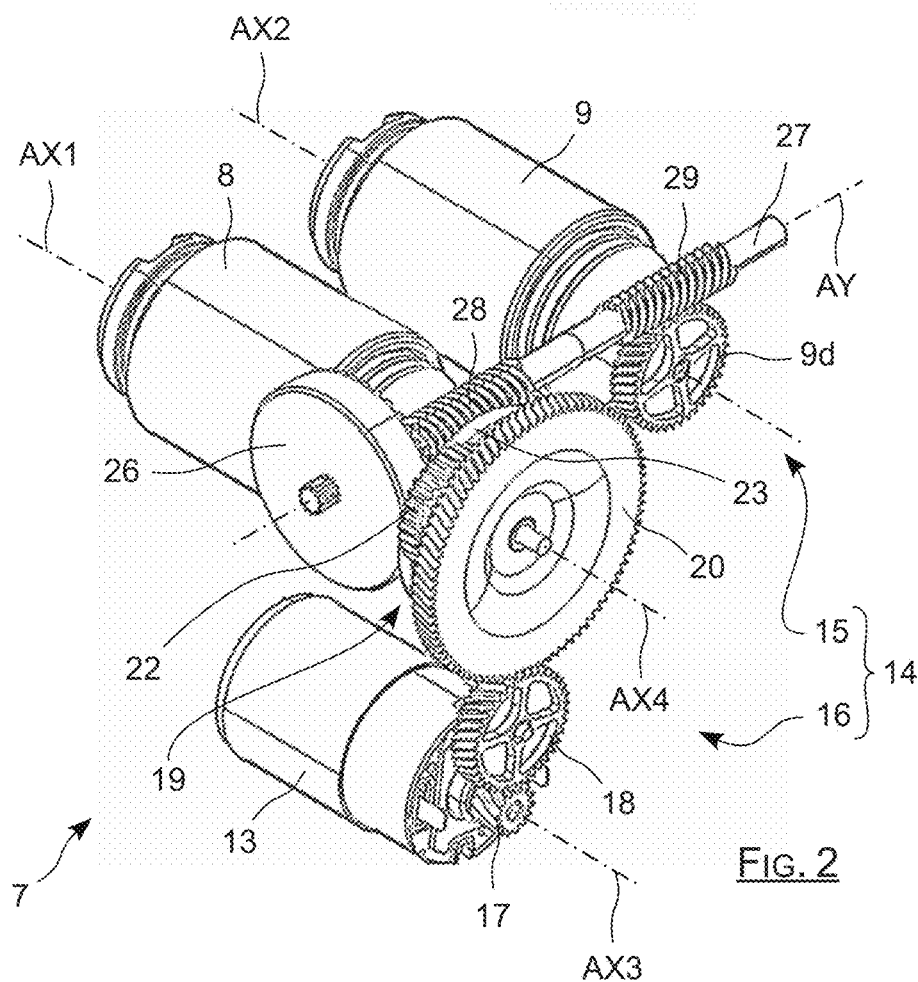
FIG. 2 is a perspective view of the electromechanical actuator according to the invention.
Figure 3:
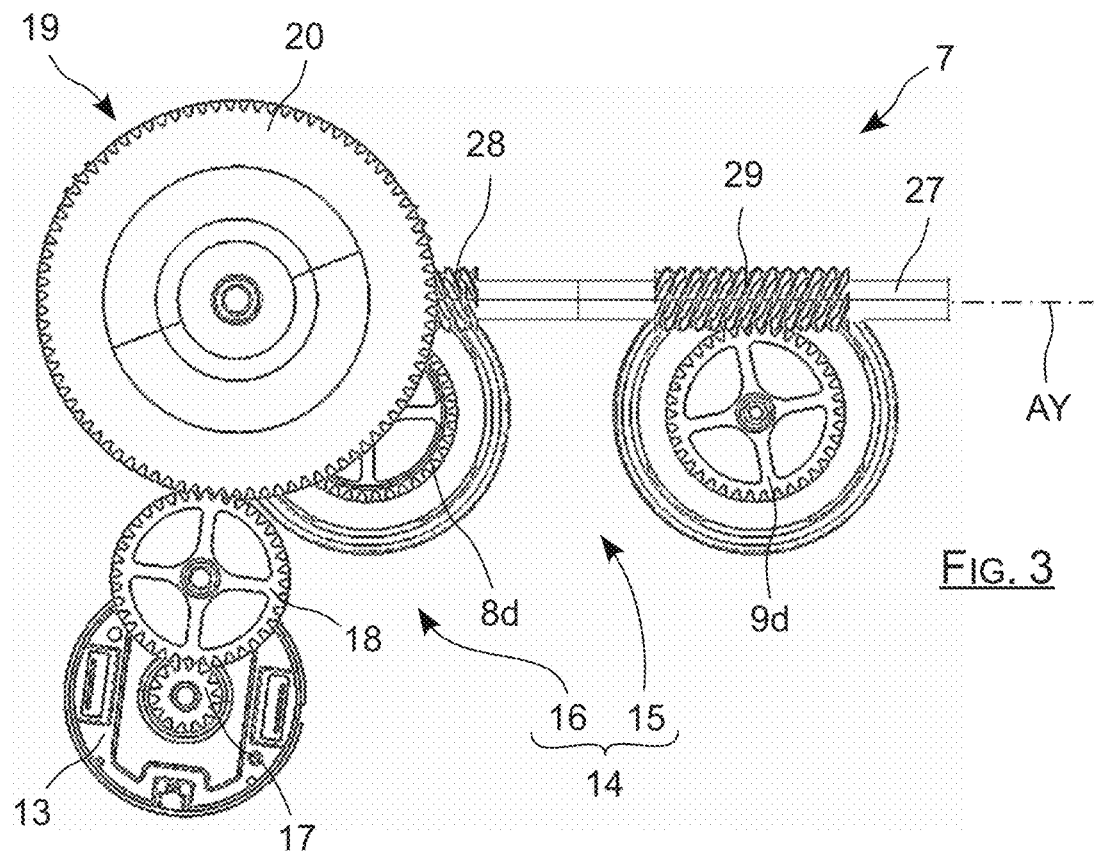
FIG. 3 is a front face of the electromechanical actuator according to the invention.

This electromechanical actuator 7 represented in FIG. 2 comprises an electric motor 13 which drives, through a driving mechanism 14, two mechanical actuators 8 and 9 arranged facing the pad 3.

This pad 3 extends sidewise, in other words extends in a direction tangential to the disc 6. Both mechanical actuators 8 and 9 are side by side along the pad 3 by extending perpendicular to the same. The first actuator 8 is facing a first portion of the pad 3 close to a first end of this pad 3 and the second mechanical actuator 9 is facing a second portion of the pad 3 close to a second end of this pad 3. The first actuator 8 is mounted in a first cavity 11 of the caliper body 2 along an axis AX1 in an axial direction, that is in a direction normal to the brake disc 6, whereas the second actuator 9 is mounted in a second cavity of the caliper body 2 along an axis AX2 parallel to AX1.

The first actuator 8 comprises a part included in the caliper body 2 with a first piston 8a which surrounds a first nut 8b screwed about a first axial drive screw 8c, and a part outside the caliper body 2 with a first drive gear 8d with helical teeth, in other words oblique teeth, which is rigidly integral with this first drive screw 8c.

The first piston 8a and the first nut 8b are rotatably locked about the axis AX1 but translationally movable along this axis AX1 whereas the first drive screw 8c and the first drive gear 8d are rotatably movable about the axis AX1 but translationally locked along this same axis AX1.

This arrangement converts a rotation of the first drive gear 8d into an axial translation of the first piston 8a along axis AX1, in one sense or the other as a function of the sense of rotation of this first drive gear 8d.

Analogously, the second actuator 9 includes a second drive gear 9d to move a second piston 9a axially along AX2 through a second nut and a second drive screw not represented.

The first and second drive gears 8d and 9d have reverse thread senses. The second actuator 9 thus ensures a conversion of the rotation of its drive gear 9d into a translation of its piston 9a which is reverse to the conversion ensured by the first actuator 8. In other words, it is when both drive gears 8d and 9d rotate in reverse senses that the first and second piston 8a and 9a move in the same axial sense.

The driving mechanism 14 comprises a transmission module 15 and a reduction module 16 which transmits a rotation of the motor 13, more precisely a rotation of a motor pinion gear 17 with oblique teeth directly driven by the motor, to the transmission module 15 with a speed lower than that of this motor pinion gear 17.

The reduction module 16 comprises as an input an oblique-tooth idler gear 18 followed by an epicyclic gear train 19, with the idler gear 18 meshed in the motor pinion gear 17 having the axis AX3, parallel to the axes AX1 and AX2, to transmit its rotation to the epicyclic gear train 19.

Figure 4:
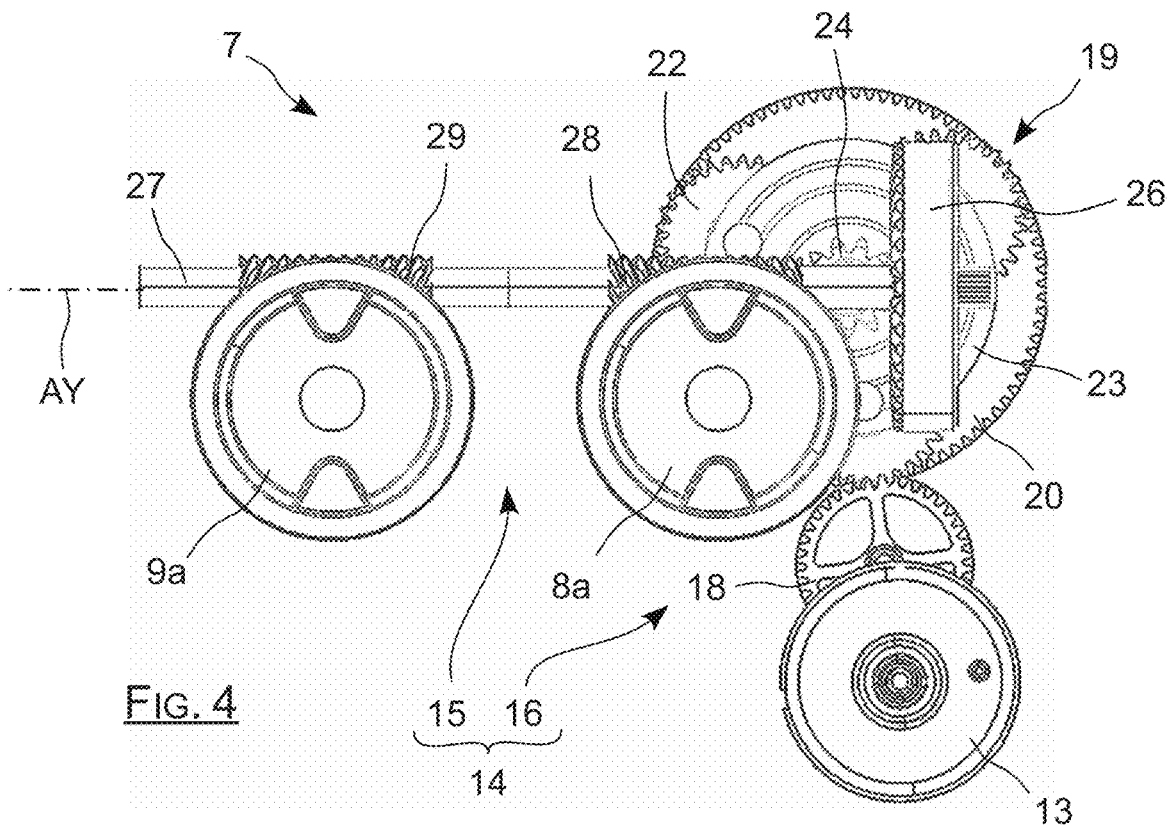
FIG. 4 is a rear view of the electromechanical actuator according to the invention showing in particular the configuration of the epicyclic reduction gear assembly.

As is visible in FIG. 4, the epicyclic gear train 19 comprises an input sun gear 20, which is an oblique tooth gear, in which the idler gear 18 is meshed to rotate this input sun gear 20 about an axis AX4 parallel to the axis AX3. The input sun gear 20 is extended along its axis of rotation AX4 to a straight-tooth sun gear 21, this sun gear 21 meshing with three planet gears 22. The planet gears 22 are pivotably mounted about their axis of revolution to a planet carrier 23 rotatably movable about the axis AX4. These planet gears 22 are meshed in a fixed circular ring gear which surrounds them, this ring gear being not represented in the figures.

With this arrangement, the rotation of the input sun gear 20 enables the planet gears 22 to rotate not only about their own axis but also with their respective axis about the axis AX4, rotating the planet carrier 23 at an output speed much lower than the input speed.

The planet carrier 23 is extended at the output of the epicyclic gear train 19 to a straight-tooth output pinion gear 24, visible in FIG. 4, which projects from the centre of the face of the planet carrier 23 opposite to the planet gears 22.

The transmission module 15 includes an angle transmission gear 26 rotated about an axis with a longitudinal direction AY perpendicular to the axis AX4, this angle transmission gear 26 being meshed in the output pinion gear 24.

This arrangement converts the rotation of the pinion gear 24 about the axis AX4 into a rotation of the angle transmission gear 26 about the axis AY which is perpendicular thereto, also called a right angle transmission.

The angle transmission gear 26 has a central through hole along the axis AY which is splined to form a slide connection of a rotary shaft 27 one end of which, which is splined accordingly, is slidably engaged in this hole. This slide connection enables the angle transmission gear 26 to rotatably drive the shaft 27 while enabling this shaft 27 to slide along AY.

The shaft 27 extends along the axis AY in a plane parallel to the plane defined by the axes AX1 and AX2 and includes a first and a second worm screws 28 and 29 which fixedly project from the same, with both worm screws 28 and 29 aligned along the axis AY. The first worm screw 28 is meshed in the first drive gear 8d and the second worm screw 29 is meshed in the second drive gear 9d.

This arrangement converts the rotation of the shaft 27 about the axis AY into a rotation of the first and second drive gears 8d and 9d about their respective axes AX1 and AX2, with the worm screws 28 and 29 integral with the shaft 27. These rotations are in turn converted by the first and second mechanical actuators 8 and 9 into an axial translation of their respective piston 8a and 9a.

Figure 5:
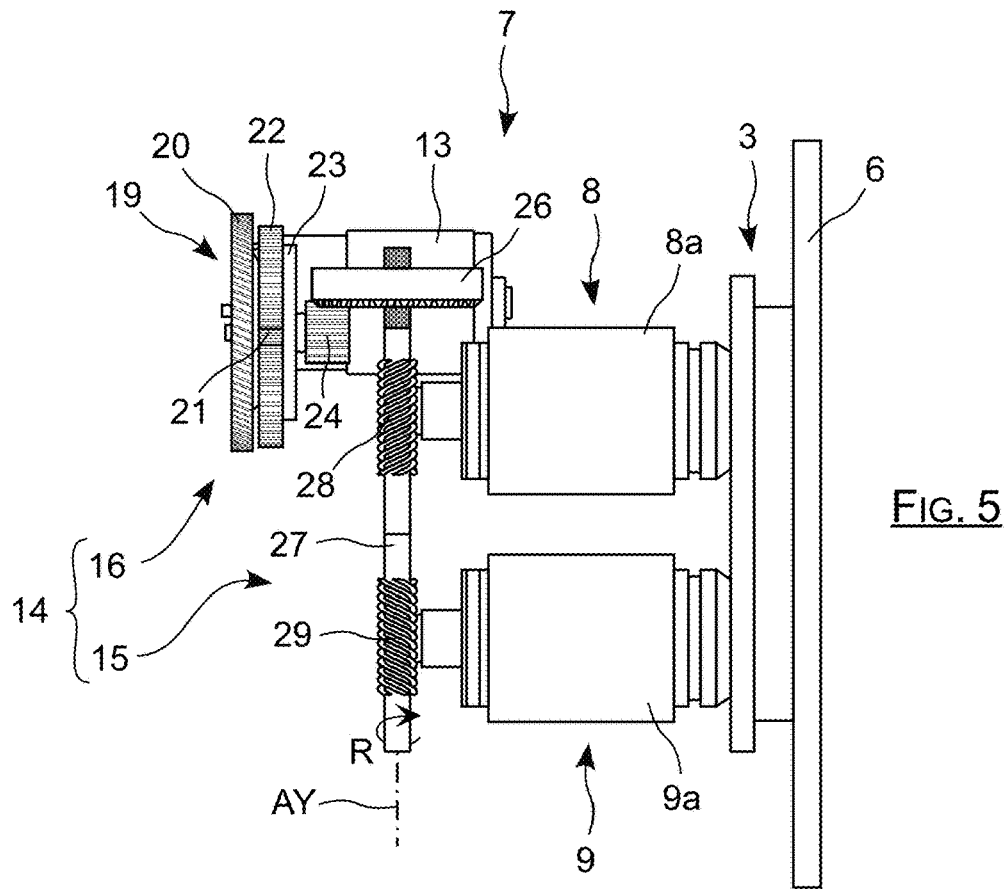
FIG. 5 is a top view of the electromechanical actuator according to the invention in a braking situation with a new pad.

Both worm screws 28 and 29 have reverse winding senses such that a rotation of the shaft 27 in a sense marked with R in FIG. 5 causes the output both pistons 8a and 9a, the mechanical actuators 8 and 9 having opposite operating modes. A rotation of the shaft 27 in a sense reverse to the sense R on the contrary causes both pistons 8a and 9a to be retracted.

In a braking situation with a pad 3 having a constant thickness as in the example of FIG. 5, both pad portions 3 pressed by the pistons come simultaneously in abutment against the disc 6 when the motor 13 is actuated.

Figure 6:
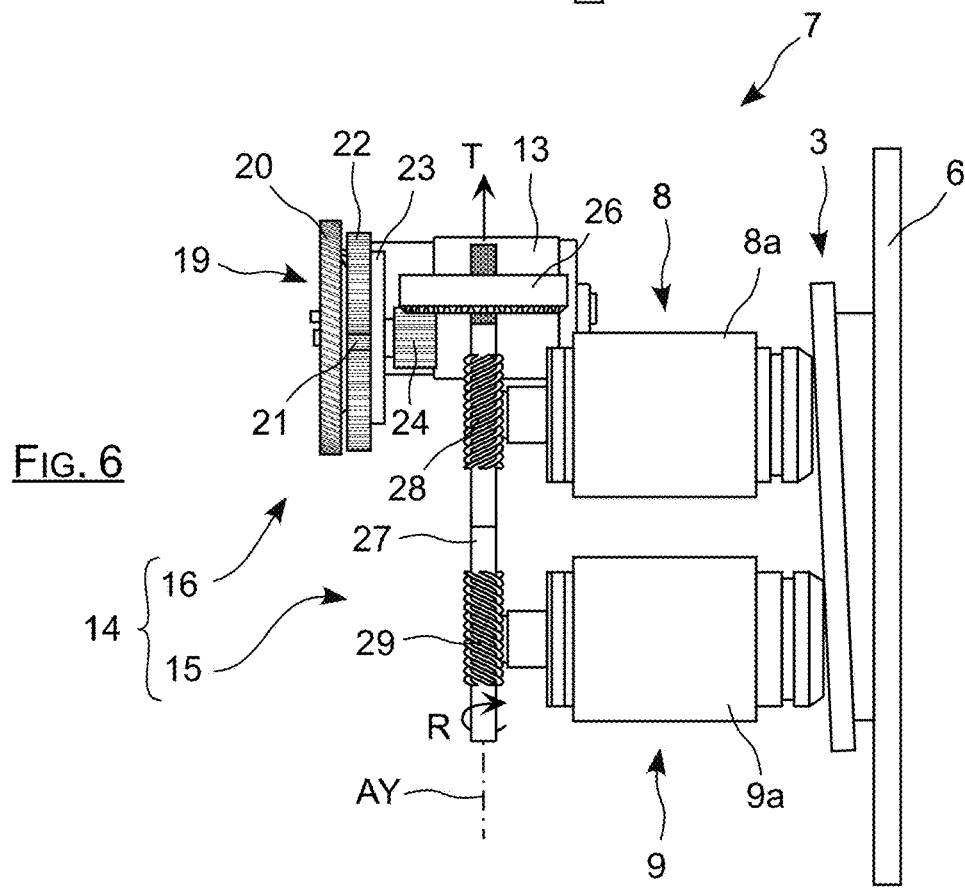
FIG. 6 is a top view of the electromechanical actuator according to the invention in a braking situation with a pad having an uneven wear.

In a braking situation with a pad 3 having an uneven wear as in FIG. 6, the pad portion 3 here pressed by the first actuator 8 comes in abutment on the brake disc 6 with the portion pressed by the second actuator 9. At this stage, the first piston 8a as well as the first drive gear 8d come to a halt, the brake disc 6 being a force opposed to the movement of the pad portion 3 pressed by the first actuator 8.

Since the motor 13 continues to rotatably drive the shaft 27, with the worm screws 28 and 29, thereby it causes this shaft 27 to be longitudinally translated along AY in a sense marked with T. Under these conditions, the second piston 9a carrying the pad portion which is not yet in contact with the disc 6 continues to progress under the combined effect of the rotation of the shaft 27 and its translation, since the first and second worm screws 28 and 29 are meshed in the first and second drive gears 8d and 9d respectively, whereas the first drive gear 8d is halted.

As soon as the pad portion associated with the second actuator 9 comes in abutment against the disc 6, the shaft 27 stops translationally moving but continues to rotate about its axis AY thus allowing a simultaneous load rise of the pads against the disc 6. The shaft 27 comes to a halt once a desired torque of the drive gears is reached.

A return to the initial state of the pad 3, i.e. in the state before braking, is allowed by rotating the shaft 27 but in a sense reverse to the sense R, with the same number of revolutions than those made during braking in the sense R, and a translation of the shaft in the sense opposite to T according to the same initial movement amplitude of T. The reverse rotation first causes both pistons 8a and 9a to be retracted until the piston 8a is fully retracted, and then the shaft 27 translationally moves in the sense opposite to T, while keeping its rotation, until the piston 9a returns to the initial position.

Generally, the caliper 1 according to the invention enables an uneven wear of the pad to be adjusted by associating a rotation of the worm screws with a slide connection, ensuring that when a first pad portion 3 comes into abutment on the disc 6, the other pad portion can continue to move until it arrives in turn in abutment against the disc 6 with the desired force.

The invention is not restricted to the described embodiment of the transmission module 15 and allows the use of various architectures as long as worm screws are integral with each other in rotation with the gear, and translationally movable with respect to the same, in other words connected to the gear through a slide connection.

Figure 7:
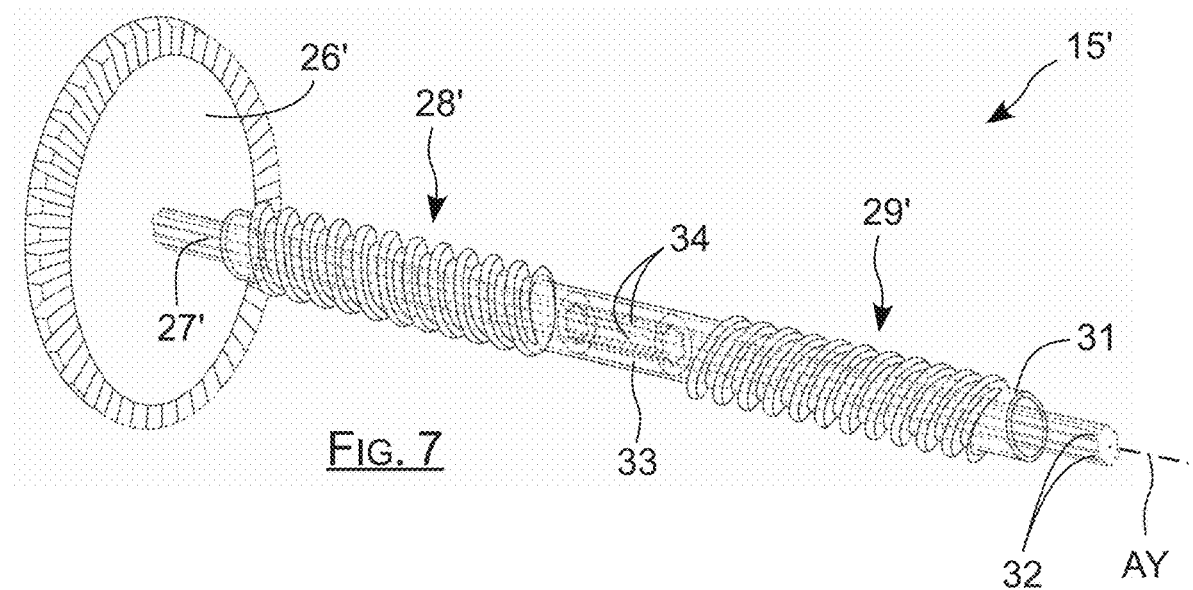
FIG. 7 is a detail view of the driving module according to an alternative of the invention.

Furthermore, in the alternative of FIG. 7, of the transmission module marked with 15', the rotary shaft 27' is translationally fixed by being rigidly integral with the angle transmission gear 26', and the worm screws 28' and 29' are aligned and formed on a distinct sleeve 31'. The shaft 27' and the sleeve 31 extend longitudinally along the axis AY, with the shaft 27' including external splines 32 along its extent, and the sleeve 31 surrounding this shaft 27' and the external splines 32. The transmission module 15' further comprises a hub 33 extending between the shaft 27' and the sleeve 31 by being rigidly connected to the sleeve 31 in its central region, that is between the worm screws 28' and 29'.

The hub 33 is provided with internal splines 34 meshed in the external splines 32. The shaft 27' and the sleeve 31, through the hub 33, are thus rotatably coupled while leaving to the sleeve 31 which carries the worms 28' and 29', a translation degree of freedom along the axis AY with respect to the shaft 27'.

Figure 8:
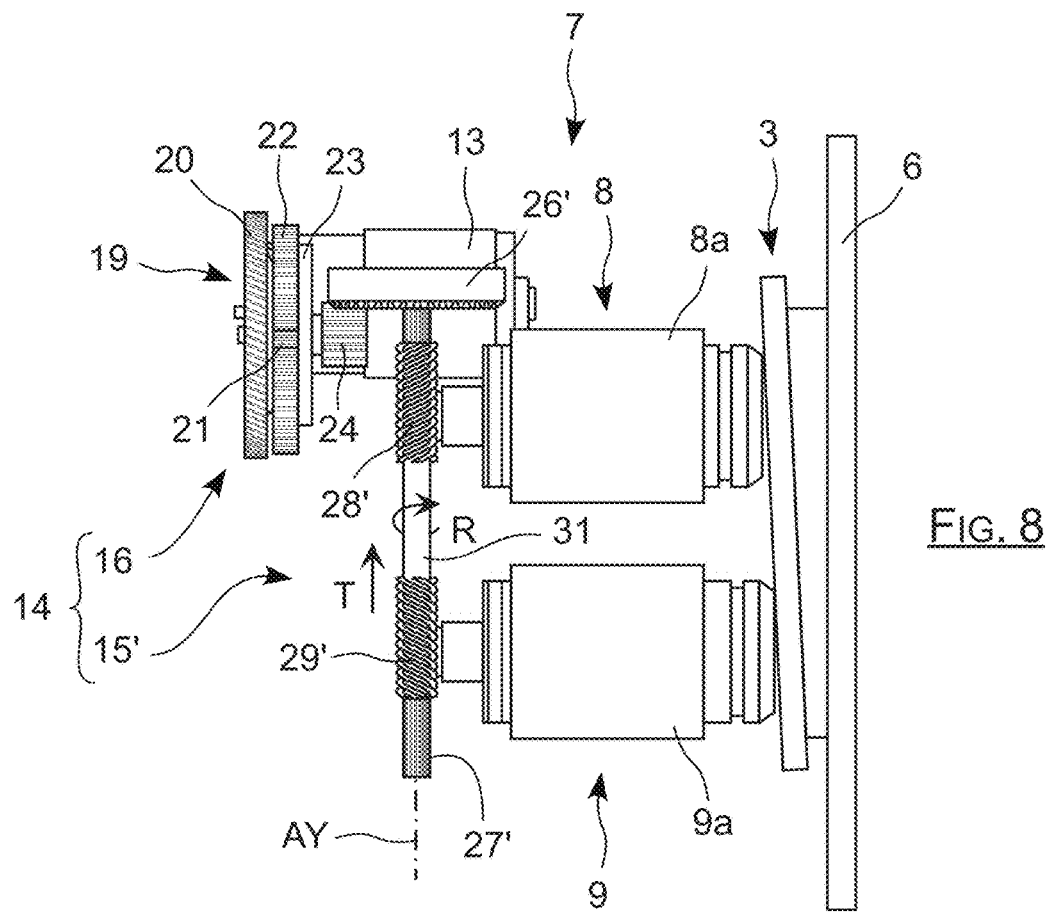
FIG. 8 is a top view of the electromechanical actuator according to one alternative of the invention in a braking situation with a pad having an uneven wear.

With this arrangement, in a braking situation illustrated in FIG. 8 with a caliper 1 provided with the transmission module 15' and a pad 3 having a wear pattern identical to that represented in FIG. 6, it is the sleeve 31 which moves in the sense marked with T, with the hub 33 sliding on the shaft 27' during their rotation marked with R when the first drive gear 8d comes to a halt.

A return to the initial state of the pad 3 is allowed by a rotation of the assembly formed by the shaft 27', hub 33 and sleeve 31 but in a sense reverse to the sense marked with R, with the same number of revolutions than those made during braking in the sense R. The reverse rotation first causes both pistons 8a and 9a to be retracted until the piston 8a is fully retracted, and then the sleeve 31 translationally moves in the sense opposite to T, while keeping its rotation, until the piston 9a returns to the initial position.

In the example of FIGS. 6 and 8, the pad portion pressed by the first actuator 8 has a lining thickness lower than that of the pad portion pressed by the second actuator 9, but it is to be noted that the invention not only brings a solution to compensate for this particular wear pattern.

Indeed on the contrary, in the case where the pad portion pressed by the first actuator 8 has a lining thickness this time higher than that of the pad portion pressed by the second actuator 9, the worms 28 and 29 or 28' and 29' move in the sense opposite to T during a braking command.

It is also to be noted that the invention could consider dispensing with the hub 33, with the internal splines 34 directly projecting from the sleeve 31 to mesh in the external splines 32 of the shaft 27', thus limiting the number of components of the transmission module 15' and simplifying the assembly thereof.

Further, the internal splines 34 are not necessarily formed in the central region of the sleeve 31, as long as they always respect the functional condition of being meshed in the external splines 32 whatever the wear state of the lining 3b. The invention could in particular provide that the external splines 32 do not extend throughout the extent of the shaft 27', since the maximum movement of the sleeve 31 with respect to the shaft 27' is restrained by both cases for which one of the lining portions 3b is in good condition whereas the other portion is fully spent.

Throughout the figures, the shafts 27 and 27' are located "above" the first and second drive gears 8d and 9d, with the axis AX1 located between the axes AX3 and AX4. But it is to be noted that the invention could provide the shaft 27 or 27' located "below" the drive gears 8d and 9d, in other words with the axis AX4 closer to the axis of rotation of the brake disc 6 than AX1 is, to respect a different overall size.

In the description below, the operation of the brake according to the invention has been explained in terms of movement of its components in order to facilitate understanding thereof. In practice, in the case of a braking with such an actuator, the movements are minute and this mechanism converts a torque exerted by the motor 13 into a pressing force exerted by each of the pistons 8a and 9a on the pad 3.

Nomenclature

---

1 caliper
2 caliper body
3 pad
3a pad support
3b pad lining
4 pad
4a pad support
4b pad lining
6 brake disc
7 electromechanical actuator
8 first mechanical actuator
8a first piston
8b first nut
8c first drive screw
8d first drive gear
9 second mechanical actuator
9a second piston
9d second drive gear
11 first cavity
13 electric motor
14 driving mechanism
15/15' transmission module
16 reduction module
17 motor pinion gear
18 idler gear
19 epicyclic gear train
20 input sun gear
21 sun gear
22 planet gears
23 planet carrier
24 output pinion gear
26 angle transmission gear
27; 27' rotary shaft
28; 28' first worm screw
29; 29' second worm swrew
31 sleeve
32 external splines
33 hub
34 internal splines
AX1 axis of translation of the first piston 8a and of rotation of the first drive gear 8d
AX2 axis of translation of the second piston 9a and of rotation of the second drive gear 9d
AX3 axis of rotation of the motor pinion gear 17
AX4 axis of rotation of the input sun gear 20
AY longitudinal axis of rotation of the worm screws

---

What is claimed is:

1. A brake caliper for overlapping a brake disc, comprising:
    a set of pads; and
    an electromechanical actuator for pressing a pad of the set of pads, wherein the electromechanical actuator comprises:
        a first mechanical actuator including a first drive gear and a first piston for pressing a first portion of the pad, the first mechanical actuator converting a rotation of the first drive gear into a translation of the first piston;
        a second mechanical actuator including a second drive gear and a second movable piston for pressing a second portion of the pad, the second mechanical actuator converting a rotation of the second drive gear into a translation of the second piston, the first and second mechanical actuators having reverse conversion senses;
        an electric motor driving the first mechanical actuator and the second mechanical actuator; and
        a transmission module comprising:
            a first worm screw and a second worm screw having a same longitudinal direction and having reverse winding senses while being rigidly connected to each other, these first and second worm screws being meshed with the first and second drive gears respectively to simultaneously rotate them in reverse senses; and
            means for rotatably driving the first and second worm screws by the electric motor, these means including splines and forming a slider enabling the first and the second worms to translationally move along the longitudinal direction.

2. The brake caliper according to claim 1, wherein the means for rotatably driving the worm screws of the transmission module includes:
    a rotary shaft rigidly carrying the first and second worm screws, this shaft being translationally movable along the longitudinal direction; and
    a translationally fixed gear rotated by the electric motor, this gear comprising a splined through hole in which a splined end of the shaft is engaged,
    wherein the splines of the means for rotatably driving the first and second worm screws are defined by the splined through hole of the translationally fixed gear and the splined end of the rotary shaft.

3. The brake caliper according to claim 1, wherein the means for rotatably driving the first and second worm screws of the transmission module includes:
    a sleeve rigidly carrying the first and second worm screws, this sleeve being translationally movable along the longitudinal direction;
    a translationally fixed gear rotated by the electric motor;
    a rotary shaft including external splines, the rotary shaft being rigidly connected to and projecting from the gear, this rotary shaft extending along the longitudinal direction and being surrounded by the sleeve; and
    internal splines carried by the sleeve with which the external splines mesh by form fitting,
    wherein the splines of the means for rotatably driving the first and second worm screws include the internal splines of the sleeve and the external splines of the rotary shaft.

4. The brake caliper according to claim 3, wherein the internal splines project from a hub rigidly connected to the sleeve.

5. The brake caliper according to claim 1, wherein the first and second drive gears have oblique teeth and rotate about axes parallel to each other and perpendicular to the longitudinal direction.

6. The brake caliper according to claim 1, further comprising a reduction module which transmits rotation of the motor to the means for rotatably driving the first and second worm screws.

7. A disc brake, comprising the brake caliper according to claim 1.

8. The brake caliper according to claim 6, wherein the reduction module includes an oblique-tooth idler gear and an epicyclic gear train, wherein the idler gear meshes with a motor pinion gear and the epicyclic gear meshes with the transmission module.

9. The brake caliper according to claim 8, wherein the transmission module includes an angle transmission gear meshing with an output pinion gear at an output of the epicyclic gear train.

10. A brake caliper for overlapping a brake disc, the brake caliper comprising:
a first pad for pressing against a first face of the disc;
a first mechanical actuator including a first drive gear and a first piston for pressing a first portion of the first pad, the first mechanical actuator converting a rotation of the first drive gear into a translation of the first piston;
a second mechanical actuator including a second drive gear and a second movable piston for pressing a second portion of the first pad, the second mechanical actuator converting a rotation of the second drive gear into a translation of the second piston;
an electric motor driving the first mechanical actuator and the second mechanical actuator; and
a transmission module comprising:
a first worm screw and a second worm screw having a same longitudinal direction and being rigidly connected to each other, these first and second worm screws being meshed with the first and second drive gears respectively to simultaneously rotate them;
a rotary shaft rigidly carrying the first and second worm screws; and
a translationally fixed gear rotated by the electric motor, the rotary shaft being coupled to the gear by splines such that the rotary shaft is rotationally fixed relative to the gear and translationally movable relative to the gear along the longitudinal direction.

11. The brake caliper according to claim 10, wherein:
the first and second mechanical actuators have reverse conversion senses,
the first and second worm gears have reverse winding senses, and
first and second worm screws are meshed with the first and second drive gears respectively to simultaneously rotate them in reverse senses.

12. The brake caliper according to claim 10, further comprising:
a second pad for pressing against a second face of the disc opposite to the first face; and
a caliper body that carries the first pad and second pad.

13. The brake caliper according to claim 12, wherein the first and second mechanical actuators are arranged on a same side of the first and second pads and are operable to press both the first and second pads against the disc.

14. The brake caliper according to claim 1, wherein the brake caliper is a floating brake caliper.

15. A disc brake comprising the floating brake caliper according to claim 14.

* * * * *